(12) United States Patent
Matthes

(10) Patent No.: US 11,657,621 B2
(45) Date of Patent: May 23, 2023

(54) METHOD FOR GENERATING CONTROL SETTINGS FOR A MOTOR VEHICLE

(71) Applicants: Renault s.a.s., Boulogne-Billancourt (FR); NISSAN MOTOR CO., LTD., Yokohama (JP)

(72) Inventor: Katrin Matthes, Biot (FR)

(73) Assignees: Renault s.a.s., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 200 days.

(21) Appl. No.: 17/289,447

(22) PCT Filed: Oct. 29, 2019

(86) PCT No.: PCT/EP2019/079531
§ 371 (c)(1),
(2) Date: Apr. 28, 2021

(87) PCT Pub. No.: WO2020/089230
PCT Pub. Date: May 7, 2020

(65) Prior Publication Data
US 2022/0004782 A1 Jan. 6, 2022

(30) Foreign Application Priority Data
Nov. 2, 2018 (FR) ...................................... 1860137

(51) Int. Cl.
*B60W 50/00* (2006.01)
*G06V 20/58* (2022.01)
(Continued)

(52) U.S. Cl.
CPC ............. *G06V 20/58* (2022.01); *B60W 50/04* (2013.01); *G06K 9/6289* (2013.01);
(Continued)

(58) Field of Classification Search
CPC .................. G06V 20/58; B60W 50/04; B60W 2050/0005; B60W 2050/0016;
(Continued)

(56) References Cited

U.S. PATENT DOCUMENTS 9,544,489 B2 * 1/2017 Laforte .................. H04N 7/181
2012/0035750 A1 2/2012 Edel
(Continued)

FOREIGN PATENT DOCUMENTS

| DE | 10 2009 019 792 A1 | 11/2010 |
| DE | 10 2017 127 972 A1 | 5/2018 |
| JP | 2015-230552 A | 12/2015 |

OTHER PUBLICATIONS

International Search Report dated Dec. 13, 2019 in PCT/EP2019/079531 filed on Oct. 29, 2019, 2 pages.

*Primary Examiner* — Ian Jen
(74) *Attorney, Agent, or Firm* — Oblon, McClelland, Maier & Neustadt, L.L.P.

(57) ABSTRACT

A method controls a motor vehicle including a plurality of sensors for acquiring raw data relative to the environment of the vehicle and a computational unit for receiving the raw data acquired by the sensors. The method includes: the computational unit receives the raw data and processes the raw data to deduce therefrom pieces of information relative to the environment of the vehicle and coefficients of probability of error in the deduction of each piece of information, and settings for controlling the vehicle are generated depending on the pieces of information and the probability coefficients. For at least one of the sensors, a quality coefficient relative to the quality of the raw data sent by this sensor is determined, the reliability of the control settings is estimated, and a decision is made to correct or not correct the control settings depending on the estimated reliability of the control settings.

11 Claims, 1 Drawing Sheet

(51) Int. Cl.
  *B60W 50/04*  (2006.01)
  *G06K 9/62*  (2022.01)
(52) U.S. Cl.
  CPC ............ *B60W 2050/0005* (2013.01); *B60W 2050/0016* (2013.01); *B60W 2420/52* (2013.01); *B60W 2555/20* (2020.02)
(58) Field of Classification Search
  CPC ......... B60W 2420/52; B60W 2555/20; B60W 2050/0215; B60W 2420/42; B60W 2552/00; B60W 2554/00; B60W 50/023; B60W 50/0225; B60W 40/06; B60W 2050/0002; G06K 9/6289; B60Y 2400/30
  See application file for complete search history.

(56) References Cited

U.S. PATENT DOCUMENTS

| | | |
|---|---|---|
| 2014/0343750 A1 | 11/2014 | Minemura et al. |
| 2018/0148047 A1 | 5/2018 | Kadetotad et al. |
| 2019/0256089 A1 | 8/2019 | Kadetotad et al. |

\* cited by examiner

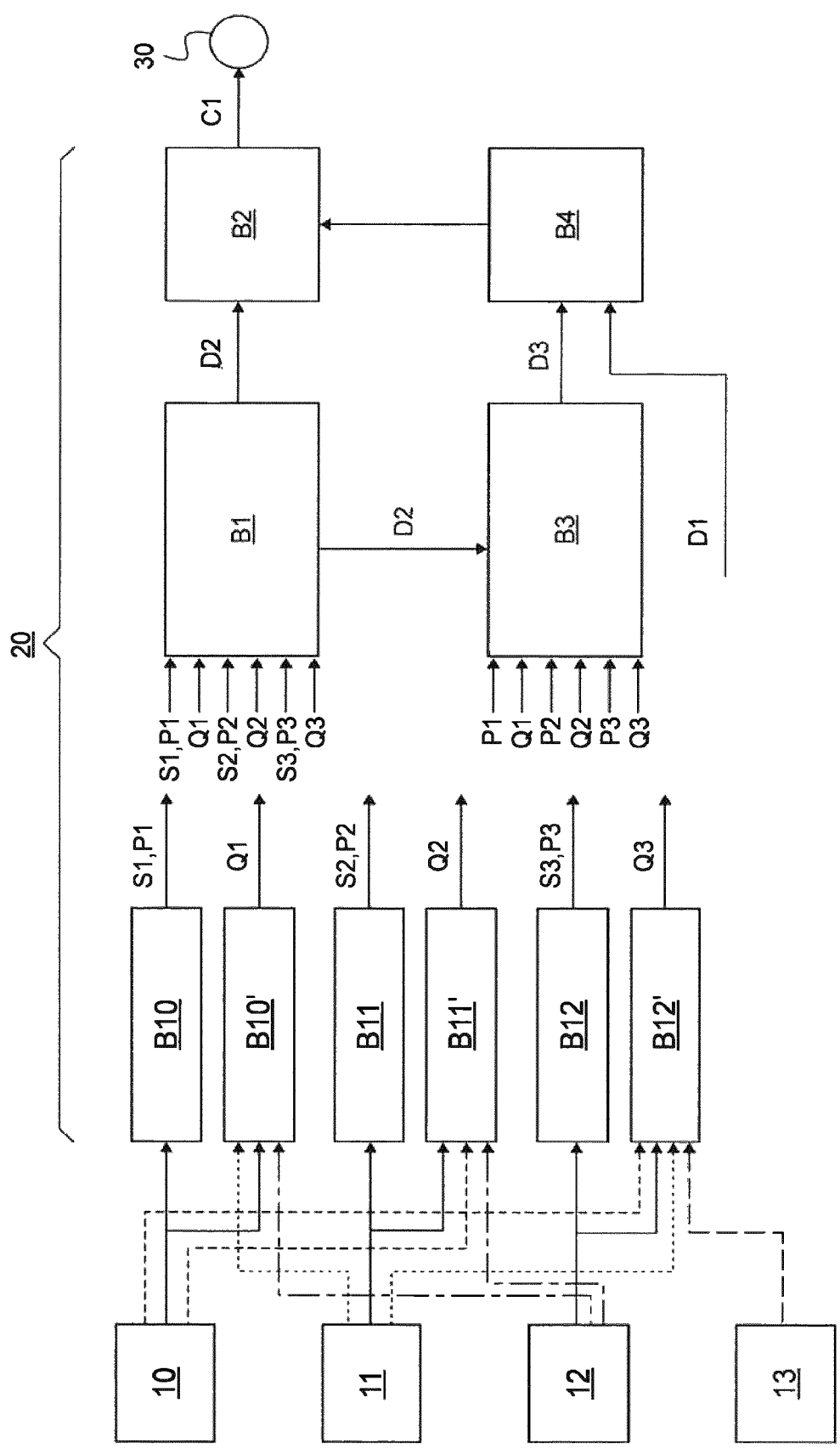

METHOD FOR GENERATING CONTROL SETTINGS FOR A MOTOR VEHICLE

TECHNICAL FIELD TO WHICH THE INVENTION RELATES

The present invention relates generally to driver assistance for motor vehicles.

It relates more particularly to a method for developing a control instruction for one or more driving members of a motor vehicle, such as the steering system, the braking system, or the powertrain.

It also relates to a motor vehicle comprising a computing unit and a plurality of sensors suitable for acquiring raw data relating to the environment of the motor vehicle.

The invention applies more particularly to vehicles equipped with an autonomous driving mode. It could thus apply to the automotive, aeronautical and aerospace fields.

TECHNOLOGICAL BACKGROUND

To facilitate driving a motor vehicle and make it safer, it is known practice to equip the latter with driver assistance systems. These may be systems allowing autonomous driving of the vehicle (without human intervention), or systems allowing partially autonomous driving of the vehicle (typically systems suitable for temporarily taking control of the vehicle, for example to apply emergency braking or to return the vehicle to the center of its lane).

To allow these systems to understand the environment around the vehicle, numerous sensors such as cameras and RADAR, LIDAR, SONAR sensors, etc. are placed on the latter.

Each sensor has its qualities and its downsides. In order to best decrease environmental detection errors, it is then known practice to perform "data fusion", that is to say to take into account the data transmitted by different sensors in order to derive therefrom a single item of environmental data. It is thus possible to benefit from the qualities of each sensor.

Unfortunately, even so, it can still happen that the vehicle makes a mistake, that is to say it misunderstands a situation. For example, it may wrongly regard a dangerous object as a harmless obstacle and therefore not command emergency braking.

It is therefore sought to decrease these errors.

SUBJECT OF THE INVENTION

The present invention provides a new method and a new system that meet functional safety level ASIL D (acronym for "Automotive Safety Integrity Level D") as defined by standard ISO26262.

More particularly, what is proposed according to the invention is a method for controlling a motor vehicle comprising steps of:
a computing unit of the vehicle receiving raw data which are acquired by sensors of the vehicle and which relate to the environment of the vehicle,
the computing unit processing said raw data in order to derive therefrom information relating to the environment of the motor vehicle and probability coefficients relating to the probability that an error has been made in the deriving of each item of information,
developing a control instruction for the motor vehicle according to said information and said probability coefficients,
determining, for at least a first of said sensors, a quality coefficient relating to the quality of the raw data that this first sensor acquires,
estimating the reliability of the control instruction according to the quality coefficients and the probability coefficients, and
deciding to correct or not to correct the control instruction according to the estimated reliability of the control instruction.

Thus, by virtue of the invention, it is possible to consider the operating conditions of the sensors (by determining the quality coefficients of these sensors) in order to decide whether the control instruction for the motor vehicle can be used as is, in complete safety.

By way of example, it is possible to determine whether the brightness is good enough to consider that the data acquired by the camera are of high quality. It is also possible to determine whether the vehicle is passing through spray or not, in order to know whether the data acquired by the LIDAR sensor are of high quality or not.

Other advantageous and non-limiting features of the control method according to the invention are as follows:
in the determining step, the quality coefficient of at least a first of the sensors is determined according to the raw data acquired by at least one other of said sensors and/or according to third-party data which are acquired by a third-party detector and which relate to the conditions of measurement of the raw data acquired by the first sensor;
the third-party detector is a light sensor or a rain sensor or a sensor suitable for detecting the state of the roadway on which the motor vehicle is driving;
at least one of said sensors is an image sensor or a RADAR sensor or a LIDAR sensor;
in the processing step, the raw data transmitted by each sensor are processed separately from the raw data transmitted by the other sensors in order to detect objects in the environment of the motor vehicle and to classify said objects, each probability coefficient being associated with a classified object and with said sensor;
in the processing step, after having processed the raw data, the processed data are fused taking into account each probability coefficient;
in the processing step, after having processed the raw data, the processed data are fused taking into account each quality coefficient;
in the estimating step, the reliability of the control instruction is estimated also according to the result of the fusion of the processed data; and
the decision to correct or not to correct the control instruction is taken also according to redundancy information from sensors distinct from said sensors.

The invention also relates to a motor vehicle comprising a plurality of sensors suitable for acquiring raw data relating to the environment of the motor vehicle and a computing unit suitable for implementing a control method as mentioned above.

DETAILED DESCRIPTION OF ONE EXEMPLARY EMBODIMENT

The following description with reference to the appended drawings, given by way of non-limiting examples, will provide an understanding of the content of the invention and how it may be implemented.

In the appended drawing, FIG. 1 is a diagram illustrating a control system suitable for implementing a method according to the invention.

The invention applies more particularly to a motor vehicle equipped with a control system allowing autonomous driving of the vehicle, that is to say without human intervention.

It relates more precisely to a method for controlling at least one driving member of the motor vehicle.

This driving member may for example be formed by the powertrain of the motor vehicle, or by the steering device or by the braking device. In the remainder of this description, it will be considered that all of these driving members are controlled by a computing unit of the vehicle.

This computing unit 20, shown in part of FIG. 1, comprises a processor, a memory and various input and output interfaces.

It is suitable for implementing distinct but interdependent algorithms, here represented in the form of blocks.

By virtue of its memory, the computing unit 20 stores a computer application, consisting of computer programs comprising instructions whose execution by the processor allows the implementation of the method which will be described below.

By virtue of its output interfaces, the computing unit 20 is connected to the driving members 30 in such a way that it can transmit a control instruction C1 to them.

By virtue of its input interfaces, the computing unit 20 is connected to several sensors 10, 11, 12, 13 (at least two sensors, but preferably more).

These may be any type of sensor.

By way of example, the motor vehicle may be equipped with a digital camera 10, a RADAR sensor 11, a LIDAR sensor 12, and a light sensor 13 oriented to cover all orientations (i.e. 360 degrees) around the vehicle.

The light sensor 13 is present to make it possible to provide a conventional function of automatically switching on the lights of the vehicle.

The other sensors 10, 11, 12, hereinafter called environmental sensors, are for their part present to ensure the function of autonomously controlling the vehicle.

Each of these environmental sensors 10, 11, 12 has qualities and downsides. For example, a camera will allow good obstacle detection in clear weather, but poorer detection in low or overly bright light. Conversely, a RADAR or LIDAR sensor will allow good obstacle detection whatever the light, but it will provide inaccurate data in the presence of spray or bad weather (rain, fog, snow).

The control instruction C1 transmitted to the driving members will here be developed mainly according to the raw data transmitted by the environmental sensors 10, 11, 12.

It is then possible to describe in detail the way in which this control instruction C1 will be developed, with reference to FIG. 1.

In practice, the computing unit 20 is programmed to implement the method described below in a recursive manner, that is to say in a loop, at regular time intervals.

This method comprises seven main steps.

During a first step, the computing unit 20 reads the raw data which have been acquired by all of the sensors 10, 11, 12, 13.

In the example considered here, the computing unit 20 reads the raw data transmitted by the camera 10, by the RADAR sensor 11, by the LIDAR sensor 12 and by the light sensor 13.

By way of example, in the case of the camera 10, the raw data are formed by the color and brightness characteristics of each pixel of the photosensitive sensor of the camera. In the case of the light sensor 13, the raw data are formed by the light levels measured over time.

During a second step, the acquired raw data are processed in order to derive therefrom information relating to the environment of the motor vehicle.

In practice, the raw data transmitted by the environmental sensors 10, 11, 12 are processed separately from each other.

The objective is to detect, on the basis of these raw data, objects located in the environment of the motor vehicle, to classify these objects (obstacle, traffic sign, third-party vehicle, pedestrian, etc.), and to assign, to each classified object S1, S2, S3, a probability coefficient P1, P2, P3 relating to the probability that an error has been made in the detection and in the classification of this object.

To implement this step, it is possible to use classification methods based on machine learning techniques, such as for example "CNN" ("convolutional neural network") techniques.

As a variant or in addition, filters or any other type of suitable processing may be used.

In summary, as shown in FIG. 1, the computing unit 20 comprises three blocks B10, B11, B12 which respectively receive as input the raw data from the camera 10, from the RADAR sensor 11 and from the LIDAR sensor 12, and which separately deliver as output a description S1, S2, S3 of each object that has been detected and classified, associated with a probability coefficient P1, P2, P3.

During a third step, the computing unit 20 determines a quality coefficient Q1, Q2, Q3 for each of the environmental sensors 10, 11, 12. This quality coefficient Q1, Q2, Q3 relates to the quality of the raw data acquired by the sensor in question.

In practice, this quality coefficient Q1, Q2, Q3 makes it possible to know to what extent the external conditions are suitable for allowing correct operation of the sensor in question.

In other words, these quality coefficients Q1, Q2, Q3 make it possible to determine:
- whether the camera 10 is able to correctly detect objects, taking into account for example the ambient light, and
- whether the RADAR 11 and LIDAR 12 sensors are able to correctly detect objects, taking into account for example the weather.

Each quality coefficient Q1, Q2, Q3 is determined according to the raw data acquired by the sensor in question (as represented by the solid arrows) but also according to the raw data acquired by other sensors (as represented by the dotted arrows).

Thus, the weather can be determined according to the images acquired by the camera 10 and the ambient light can be acquired by the light sensor 13.

Of course, other sensors could be used, in particular to determine the weather. Thus, it would be possible to use a rain sensor and/or accelerometers which would be located in the wheels of the vehicle and which would be suitable for detecting the state of the roadway on which the motor vehicle is driving.

The raw data from the sensors 10, 11, 12, 13 are used to determine each quality coefficient Q1, Q2, Q3 by applying here:
- statistical methods (in the case of raw data from the camera 10, it is possible in particular to use "BRIQUE" or "NIQUE" methods), and/or
- frequency methods (in the case of raw data from the camera 10, it is also possible to use "Sharpness/Blur" or "High-Low Frequency Index" methods to determine the sharpness of the images; in the case of raw data from the LIDAR sensor, it is possible to use "RMSE with reference", "HDMAP and GPS" or "covariance matrix/entropy measurement" methods).

In summary, as shown in FIG. 1, the computing unit 20 comprises three blocks B10', B11', B12' which receive as input the raw data from the camera 10 and/or from the RADAR sensor 11 and/or from the LIDAR sensor 12 and/or from the light sensor 13, and which each deliver as output a quality coefficient Q1, Q2, Q3 which is associated with one of the environmental sensors 10, 11, 12 and which relates to the level of precision of the measurements taken by this sensor taking into account the driving conditions.

As will become apparent below, estimating a quality coefficient for each environmental sensor 10, 11, 12 will then make it possible to favor the one or more sensors for which the operating conditions are estimated to be the best and which therefore deliver the most reliable raw data.

During a fourth step, provision is made to fuse the data from the various environmental sensors 10, 11, 12.

For this, it would be possible to fuse, on the one hand, the raw data acquired by the sensors, and, on the other hand, the data from the blocks B10, B11, B12.

However, it will be considered here that only the data from the blocks B10, B11, B12 (namely the descriptions S1, S2, S3) will be fused.

These data are fused here taking into account each probability coefficient P1, P2, P3, and potentially also according to each quality coefficient Q1, Q2, Q3.

What is meant by "data fusion" is a mathematical method which is applied to several data from heterogeneous sensors and which makes it possible to refine the detection and the classification of the objects present around the motor vehicle.

For example, the data from the images acquired by the camera 10 can be fused with the data from the RADAR 11 and LIDAR 12 sensors in order to better estimate the exact position and the dynamics (speed and acceleration) of the objects detected in the images acquired by the camera 10.

The probability P1, P2, P3 and quality Q1, Q2, Q3 coefficients are then used to dynamically adjust the weights of each environmental sensor 10, 11, 12 for the detection and the classification of the objects.

In summary, as shown in FIG. 1, the computing unit 20 comprises a block B1 which receives as input the descriptions S1, S2, S3 of the detected objects as well as the probability P1, P2, P3 and quality Q1, Q2, Q3 coefficients, and which delivers as output a result D2 which comprises the descriptions (category, position and dynamics) of each object that has been detected by several environmental sensors and has been checked by the data fusion algorithms.

By virtue of this result D2, during a fifth step, the computing unit 20 develops a control instruction C1 for the various driving members 30 of the motor vehicle.

For this, as shown in FIG. 1, the computing unit 20 comprises a block B2 which receives as input the result D2 from the block B1 and which delivers as output the control instruction C1.

This control instruction C1 is therefore produced taking into account the assessment by the computing unit 20 of the environment of the vehicle.

To prevent any error in this assessment from having dangerous consequences for the occupants of the vehicle, two additional steps are also provided in order to make the method safe.

During a sixth step, the computing unit 20 estimates the reliability of the control instruction C1 according to the quality Q1, Q2, Q3 and probability P1, P2, P3 coefficients.

In practice, the reliability of the control instruction C1 is estimated by means of a reliability coefficient D3.

The algorithm for calculating this reliability coefficient D3 could for example be based on a method of correlating the quality coefficients Q1, Q2, Q3 and the probability coefficients P1, P2, P3.

Preferably, the reliability coefficient D3 will be determined mainly according to the quality coefficients Q1, Q2, Q3.

Specifically, if these quality coefficients Q1, Q2, Q3 indicate that a majority of the environmental sensors 10, 11, 12 are operating in conditions which do not allow the vehicle to have a good understanding of its environment, it is this information which will mainly be taken into account in determining the reliability coefficient D3 (whatever the values of the probability coefficients).

In other words, the probability coefficients P1, P2, P3 have a lower statistical weight than the quality coefficients Q1, Q2, Q3.

Moreover, the greater the number of sensors used to determine the quality coefficient of a given sensor, the greater the weight of this quality coefficient in the calculation of the reliability coefficient D3.

The algorithm for calculating the reliability coefficient D3 will be able to take other data into account. Thus, preferably, the reliability coefficient D3 will be estimated also according to the result D2 of the fusion. In this way, if the result D2 of the fusion is inconsistent, this inconsistency will be able to be taken into account in calculating the reliability coefficient D3.

In summary, as shown in FIG. 1, the computing unit 20 comprises a block B3 which receives as input the probability P1, P2, P3 and quality Q1, Q2, Q3 coefficients as well as the result D2 of the fusion, and which delivers as output the reliability coefficient D3.

During a seventh step, the computing unit 20 will then take the decision to correct or not to correct the control instruction C1 (before sending the latter to the driving members 30).

This decision is taken mainly by taking into account the reliability coefficient D3.

Preferably, this decision will be able to be taken also according to redundancy information D1 from sensors distinct from the sensors 10, 11, 12 considered up until then.

In practice, if the reliability coefficient D3 is below a threshold and/or if the redundancy information D1 indicates an inconsistency between the data considered, it is envisaged that the computing unit 20 will request a correction of the control instruction C1.

The action resulting from this correction may be, for example, disengaging the autonomous driving mode of the vehicle or stopping taking into account the raw data from one or more previously identified sensors.

In summary, as shown in FIG. 1, the computing unit 20 comprises a block B4 which receives as input the reliability coefficient D3 as well as the redundancy information D1, and which potentially delivers as output an instruction to correct the control instruction C1.

This block B4 is formed by an algorithm whose objective is to ensure an ASIL-D safety level within the meaning of the ISO26262 standard.

The invention claimed is:

1. A method for controlling a motor vehicle comprising a computing unit and a plurality of sensors configured to acquire raw data relating to an environment of the motor vehicle, said method comprising:
- receiving by the computing unit of the raw data acquired by the sensors;
- processing by the computing unit of said raw data to derive therefrom information relating to the environment of the motor vehicle and probability coefficients relating to the probability that an error has been made in the deriving of each item of information;
- developing a control instruction for the motor vehicle according to said information and said probability coefficients;
- determining, for at least a first of said sensors, a quality coefficient relating to the quality of the raw data that the first sensor acquires;
- estimating the reliability of the control instruction according to the quality coefficients and the probability coefficients; and
- deciding to correct or not to correct the control instruction according to the estimated reliability of the control instruction.

2. The control method as claimed in claim 1, wherein the determining includes determining the quality coefficient of at least the first of the sensors according to the raw data acquired by at least one other of said sensors and/or according to third-party data which are acquired by a third-party detector and which relate to the conditions of measurement of the raw data acquired by the first sensor.

3. The control method as claimed in claim 2, wherein the third-party detector is a light sensor, a rain sensor, or a sensor configured to detect the state of the roadway on which the motor vehicle is driving.

4. The control method as claimed in claim 1, wherein at least one of said sensors is an image sensor, a RADAR sensor, or a LIDAR sensor.

5. The control method as claimed in claim 1, wherein in the processing includes processing the raw data transmitted by each sensor separately from the raw data transmitted by the other sensors in order to detect objects in the environment of the motor vehicle and to classify said objects, each probability coefficient being associated with a classified object and with said sensor.

6. The control method as claimed in claim 5, wherein the processing includes, after having processed the raw data, fusing the processed data taking into account each probability coefficient.

7. The control method as claimed in claim 6, wherein the estimating includes estimating the reliability of the control instruction according to the result of the fusing the processed data.

8. The control method as claimed in claim 5, wherein the processing includes, after having processed the raw data, fusing the processed data taking into account each quality coefficient.

9. The control method as claimed in claim 8, wherein the estimating includes estimating the reliability of the control instruction according to the result of the fusing the processed data.

10. The control method as claimed in claim 1, wherein the deciding to correct or not to correct the control instruction also include deciding according to redundancy information from sensors distinct from said sensors.

11. A motor vehicle comprising:
- a plurality of sensors configured to acquiring raw data relating to the environment of the motor vehicle; and
- a computing unit that is configured to implement the control method as claimed in claim 1.

* * * * *